(12) United States Patent
Ishii et al.

(10) Patent No.: US 11,332,201 B2
(45) Date of Patent: May 17, 2022

(54) WORK VEHICLE

(71) Applicant: Kubota Corporation, Osaka (JP)

(72) Inventors: Yuji Ishii, Sakai (JP); Takashi Fujii, Sakai (JP)

(73) Assignee: Kubota Corporation, Osaka (JP)

(*) Notice: Subject to any disclaimer, the term of this patent is extended or adjusted under 35 U.S.C. 154(b) by 70 days.

(21) Appl. No.: 16/874,350

(22) Filed: May 14, 2020

(65) Prior Publication Data

US 2021/0086843 A1    Mar. 25, 2021

(30) Foreign Application Priority Data

Sep. 20, 2019   (JP) ............................. JP2019-171940

(51) Int. Cl.
| | |
|---|---|
| *B62D 33/037* | (2006.01) |
| *B62D 33/03* | (2006.01) |
| *E05B 83/18* | (2014.01) |
| *E05C 3/00* | (2006.01) |
| *E05C 9/00* | (2006.01) |
| *B62D 33/027* | (2006.01) |

(52) U.S. Cl.
CPC ....... *B62D 33/037* (2013.01); *B62D 33/0273* (2013.01); *B62D 33/03* (2013.01); *E05B 83/18* (2013.01); *E05C 3/004* (2013.01); *E05C 9/006* (2013.01)

(58) Field of Classification Search
CPC .. B62D 33/0273; B62D 33/03; B62D 33/037; E05C 3/004; E05C 9/006; E05B 83/02; E05B 83/16; E05B 83/18; E05B 83/42
See application file for complete search history.

(56) References Cited

U.S. PATENT DOCUMENTS

| | | | | |
|---|---|---|---|---|
| 5,556,152 | A | * | 9/1996 | Dunlap .............. B62D 33/0273 296/180.1 |
| 6,276,738 | B1 | * | 8/2001 | Marshall .................. B60P 1/26 296/37.6 |
| 9,522,704 | B1 | * | 12/2016 | Krajenke ................ E05F 1/002 |
| 2003/0006616 | A1 | | 1/2003 | Katoh et al. |
| 2003/0025348 | A1 | | 2/2003 | Bobbitt, III et al. |
| 2006/0001288 | A1 | * | 1/2006 | Thiele ................... E05D 15/505 296/50 |

(Continued)

FOREIGN PATENT DOCUMENTS

| | | |
|---|---|---|
| DE | 202016103278 U1 | 12/2016 |
| EP | 1273746 A1 | 1/2003 |
| JP | 201343527 A | 3/2013 |

*Primary Examiner* — Gregory A Blankenship
(74) *Attorney, Agent, or Firm* — The Webb Law Firm

(57) ABSTRACT

In a work vehicle of the present invention, a load carrying bed includes a floor panel, a pair of left and right side panels, and a rear gate which is openable and closable. The rear gate includes left and right lock operational portions for maintaining the rear gate under a closing posture through engagement with locking engagement portions formed in the left and right side panels, a single handle disposed at an intermediate position in the left/right direction of the rear gate and supported to be pivotable about a horizontally oriented operational axis X, and left and right operational wires for operating left and right locking members in a direction for pulling these locking members out of the locking engagement portions by an operation of the handle about the operational axis X.

5 Claims, 9 Drawing Sheets

(56) References Cited

U.S. PATENT DOCUMENTS

| | | | |
|---|---|---|---|
| 2013/0207405 A1* | 8/2013 | Gruber | E05B 77/38 |
| | | | 292/197 |
| 2013/0292967 A1* | 11/2013 | Schmitz | B62D 33/037 |
| | | | 296/180.1 |
| 2014/0136021 A1* | 5/2014 | Bambenek | G07C 5/008 |
| | | | 701/2 |
| 2016/0368543 A1 | 12/2016 | Puscas et al. | |
| 2018/0038139 A1* | 2/2018 | Zindler | B62D 25/12 |
| 2021/0086843 A1* | 3/2021 | Ishii | E05C 9/006 |
| 2021/0180367 A1* | 6/2021 | Nagase | E05B 83/00 |

* cited by examiner

WORK VEHICLE

CROSS-REFERENCE TO RELATED APPLICATION

This application claims priority to Japanese Patent Application No. 2019-171940 filed Sep. 20, 2019, the disclosure of which is hereby incorporated by reference in its entirety.

TECHNICAL FIELD

The present invention relates to a work vehicle having a load carrying bed mounted on a vehicle body.

BACKGROUND ART

As a work vehicle having the above-described arrangement, Patent Document 1 discloses an arrangement in which a rear gate is provided at a rear end of the load carrying bed to be openable and closable, locking mechanisms are provided for maintaining the rear gate at its closed position, and a lock releasing means is provided for releasing locking of the locking mechanism by an operation of a handle.

BACKGROUND ART DOCUMENT

Patent Document

Patent Document 1: Japanese Unexamined Patent Application No. 2013-43527

SUMMARY OF THE INVENTION

Problem to be Solved by Invention

In Patent Document 1, engagement portions are provided at rear end portions of left and right side panels of the load carrying bed. Rods engageable with these engagement portions are provided under a horizontal posture relative to the rear gate, and a lock releasing handle for releasing locking by pulling the left and right rods is provided at the center of the rear gate.

When the locking mechanism provided in the rear gate is considered, as described also in Patent Document 1, it is desirable if the left and right locking mechanisms are releasable by an operation of the handle provided at the center in the left/right direction of the rear gate.

However, the locking mechanisms described in Patent Document 1 are configured to engage outer end portions of the left and right rods with the engagement portions. As the inner end portions of the left and right rods are to be operably coupled with the handle, high dimensional precision is required in the length (total length) of the rods, thus requiring long time for machining of the rods and requiring great trouble for assembly also.

For the reason mentioned above, there is a need for a work vehicle that allows assembly of a locking mechanism of a rear gate without much trouble.

Solution

According to a characterizing feature of a work vehicle relating to the present invention:
a load carrying bed includes a floor panel, a pair of left and right side panels, a rear gate supported to be openable and closable, and a locking mechanism for maintaining the rear gate under its closing posture; and
the locking mechanism includes left and right locking members configured to maintain the rear gate under the closing posture by engaging locking engagement portions formed in the left and right side panels, a single handle disposed at an intermediate position in the left/right direction of the rear gate and supported to be pivotable about a horizontally oriented operational axis, and left and right operational wires for operating the left and right locking members in a direction for pulling these locking members out of the locking engagement portions by an operation of the handle about the operational axis.

With this characterizing arrangement, the locking mechanism maintains the rear gate under the closing posture through engagement of the left and right locking members with the left and right locking engagement portions corresponding thereto. Further, the locking mechanism realizes releasing of its locking state as the left and right operational wires operate the locking members in the direction of pulling these members out from the locking engagement portions in response to an operation of the handle. In particular, with this locking mechanism, as the locking members and the handle are operably coupled to each other via the operational wires, although positional precision is required for supporting the locking members to the rear gate, no high precision is required in the length of the operational wires or the positioning of the handle.

Thus, there has been realized a work vehicle that allows assembly of a locking mechanism of a rear gate without much trouble.

According to a preferred arrangement to be added to the above-described arrangement: the locking mechanism includes an arrangement of supporting the locking members to be pivotable respectively about a shaft member and an urging member for causing the rear gate to protrude to the outer side from the left and right end portions of the rear gate by an urging force.

With the above arrangement, as the locking members are pivotally supported and are caused to protrude to the outer side by an urging force of an urging member, more smooth operation is made possible in comparison with a slidably movable arrangement and engagement and disengagement with/from the locking engagement portions can be effected in a reliable manner also.

According to a preferred arrangement to be added to the above-described arrangement:
the handle includes a manually operable handle body, a pair of left and right supporting portions formed coaxial with the operational axis relative to positions continuous from opposed ends of the handle body, and a pair of left and right operational portions formed at positions continuous from the pair of supporting portions;
the left side locking member and the operational portion on the left side of the handle are operably coupled to each other via an inner wire of the left side operational wire; and
the right side locking member and the operational portion on the right side of the handle are operably coupled to each other via an inner wire of the right side operational wire.

With the above-described arrangement, if the handle body portion is operated with this handle body portion being supported by the pair of left and right supporting portions, the handle body and the left and right operational portions are pivoted together about the operational axis. And, when the handle body is operated in this way, forces associated with displacements of the left and right operational portions are applied to the inner wires of the left and right operational wires, so that the locking members can be operated in the locking releasing direction by the tensile forces of the inner wires.

According to a preferred arrangement to be added to the above-described arrangement, the handle is formed by bending a single round bar member to form the handle body portion, the pair of supporting portions and the pair of operational portions integral with each other.

With the above-described arrangement, by bending a round bar member, the handle body portion, the pair of supporting portions and the pair of operational portions can be created to together form the handle. Namely, with the above-described arrangement, there are no need to manufacture the handle by e.g. molding resin in a mold, by a press work or the like on a metal plate, etc. Thus, manufacture is made easy and cost reduction too is realized.

According to a preferred arrangement to be added to the above-described arrangement, the handle and the left and right locking members are operably coupled to each other by connecting inner end rings to inner ends of the left and right inner wires and connecting outer end rings to outer ends thereof and also by inserting into the inner end rings the left and right operational portions of the handle corresponding thereto and inserting into the outer end rings the left and right locking members corresponding thereto.

With the above-described arrangement, preliminarily, the inner end rings will be connected to the inner ends of the inner wires of the left and right operational wires and the outer end rings will be connected to the outer ends thereof. Then, at the time of assembly, the operational portions of the handle will be inserted into the inner end rings and the locking members will be inserted into the outer end rings. This will complete the assembly. Thus, the assembly can be carried out easily. Further, this arrangement facilitates maintenance also.

EMBODIMENT

Figure 1:
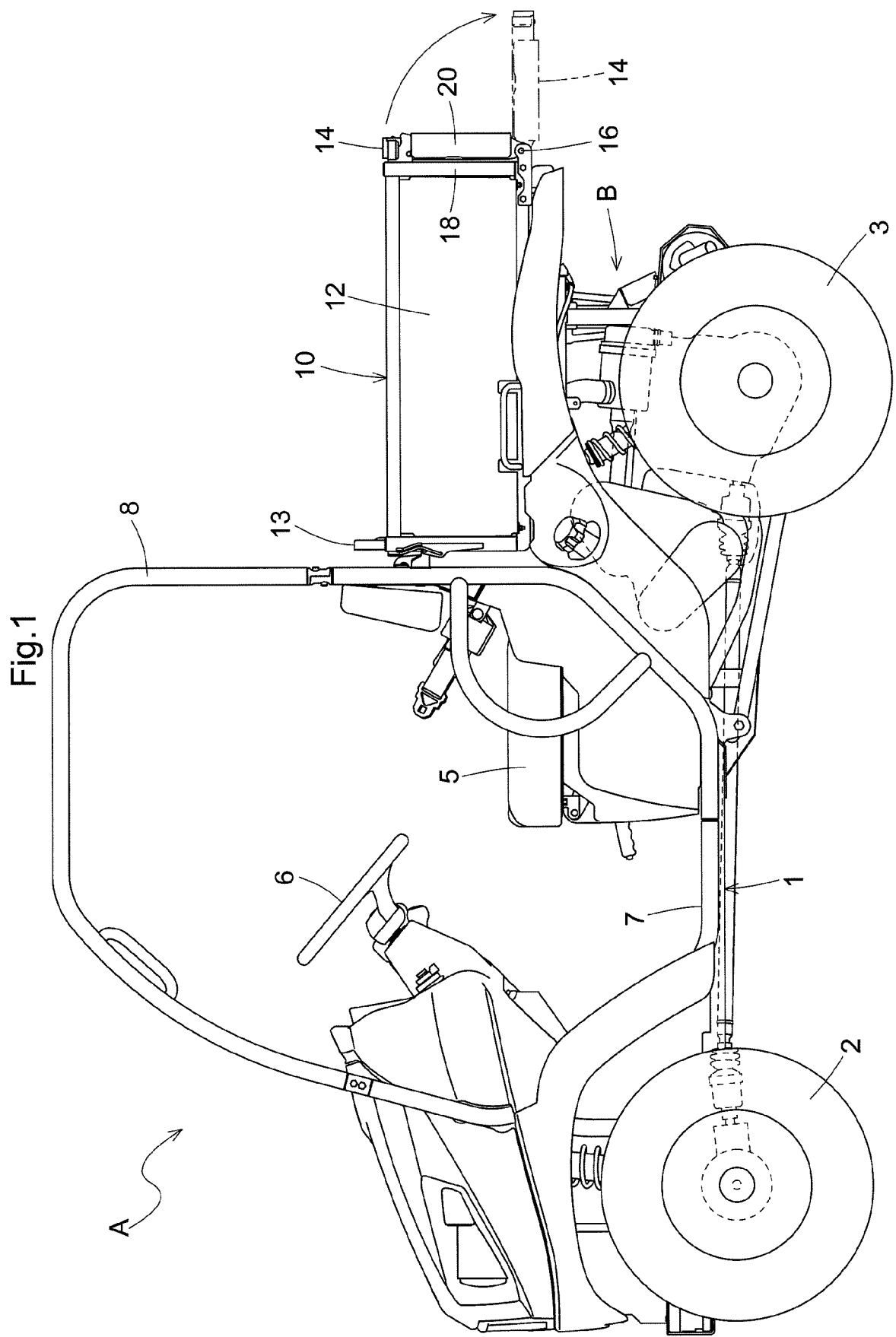
FIG. 1 is a side view of a work vehicle.
Figure 2:
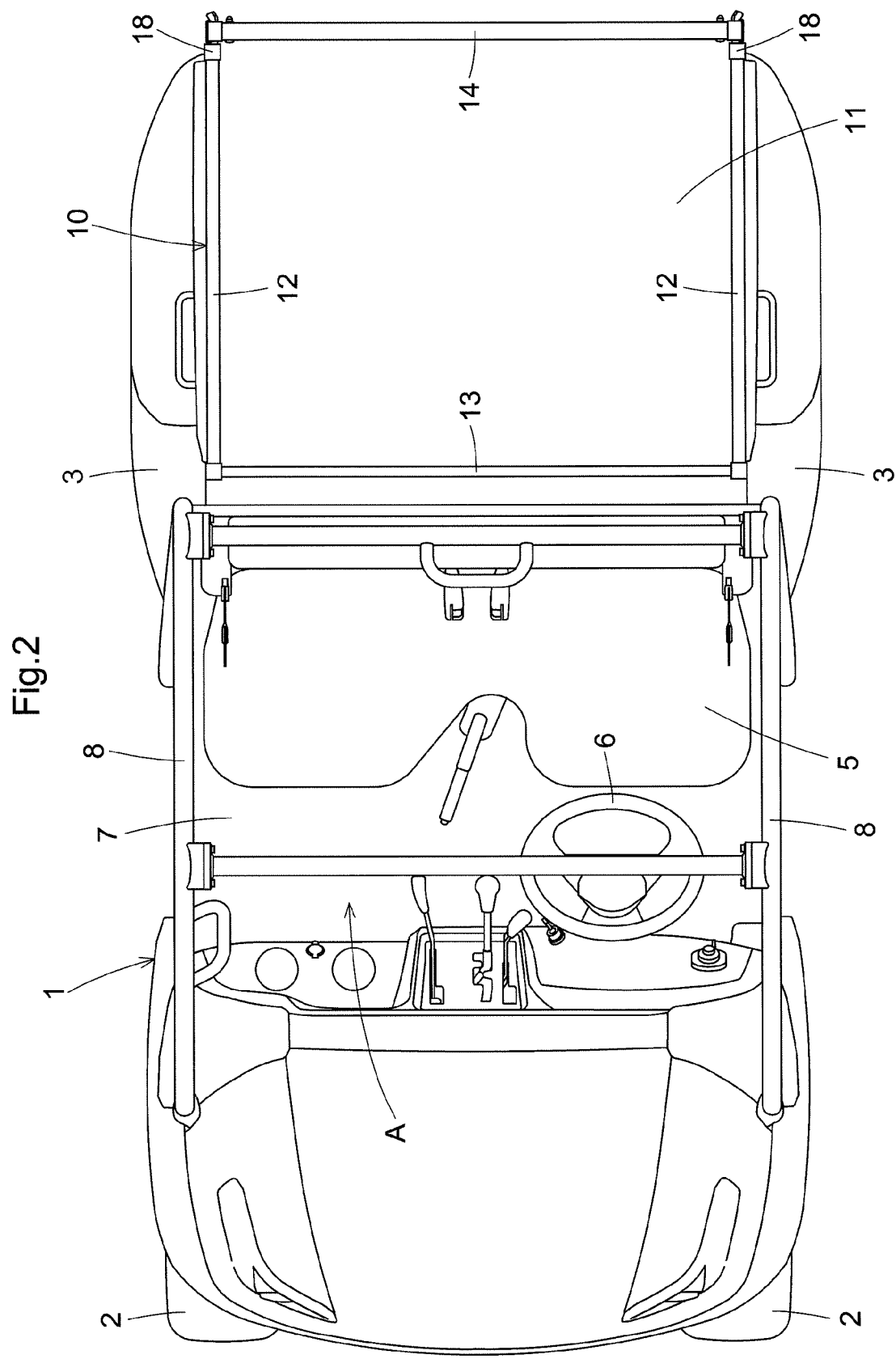
FIG. 2 is a plan view of the work vehicle.

Next, an embodiment of the present invention will be explained with reference to the accompanying drawings.
[General Configuration]
As shown in FIG. 1 and FIG. 2, a work vehicle comprises a pair of left and right front wheels 2 provided at front portions of a vehicle body 1, a pair of left and right rear wheels 3 provided at rear portions of the vehicle body 1, a driving section A provided at the center portion of the vehicle body 1, a load carrying bed 10 provided at a rear portion of the vehicle body 1 and an engine section B provided under the load carrying bed 10.

This work vehicle is configured as a four-wheel drive type configured such that driving force from the engine section B is transmitted to the front wheels 2 and the rear wheels 3 and configured as a utility vehicle for use in works for multiple purposes such as an agricultural work, a transporting work, etc. The load carrying bed 10 can be switched to a forwardly elevated inclined posture by an action of a dump cylinder (not shown), thus allowing discharging of the load to the rear side under the gravity effect.

The driving section A includes a driver' seat 5 to be seated by a driver. Forwardly of this driver's seat 5, there is provided a steering wheel 6 for steering the front wheels 2 and downwardly thereof, a floor 7 is provided. The driving section A is provided with ROPS frames 8 at the left and right positions of this driving section A for protecting the driver and/or a passenger in the event of fall or rollover of the vehicle body 1.

[Load Carrying Bed]

Figure 3:
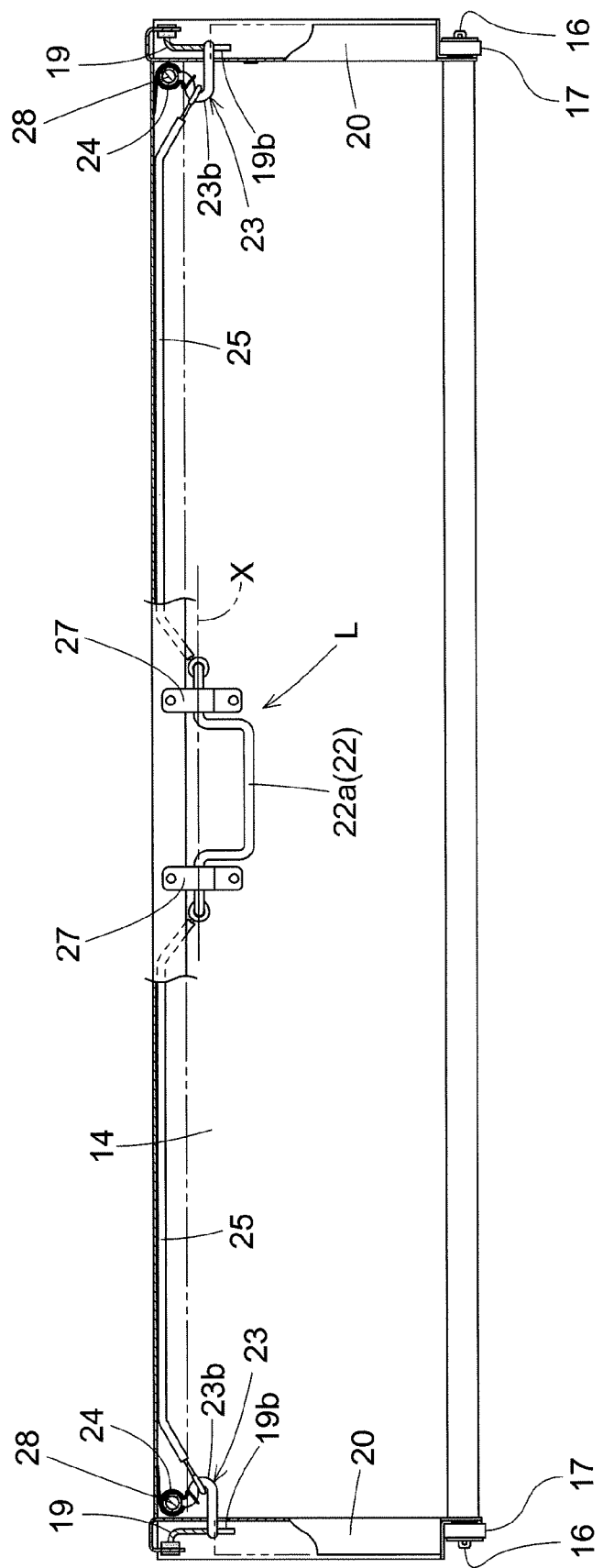
FIG. 3 is a rear view of a rear gate.

As shown in FIGS. 1 through 3, the load carrying bed 10 includes a floor panel 11 forming the bottom wall of this load carrying bed 10, a pair of left and right side panels 12, a front panel 13 disposed on the front side and a rear gate 14 provided at the rear end and supported to be openable and closable about a horizontally oriented opening/closing support shaft 16. The rear gate 14 is provided with a locking mechanism L for maintaining this rear gate 14 under a closing posture indicated by solid lines in FIG. 1. By releasing the locking state of the locking mechanism L, the rear gate 14 can be switched to an opening posture indicated by two-dot chain lines in FIG. 1.

Figure 4:
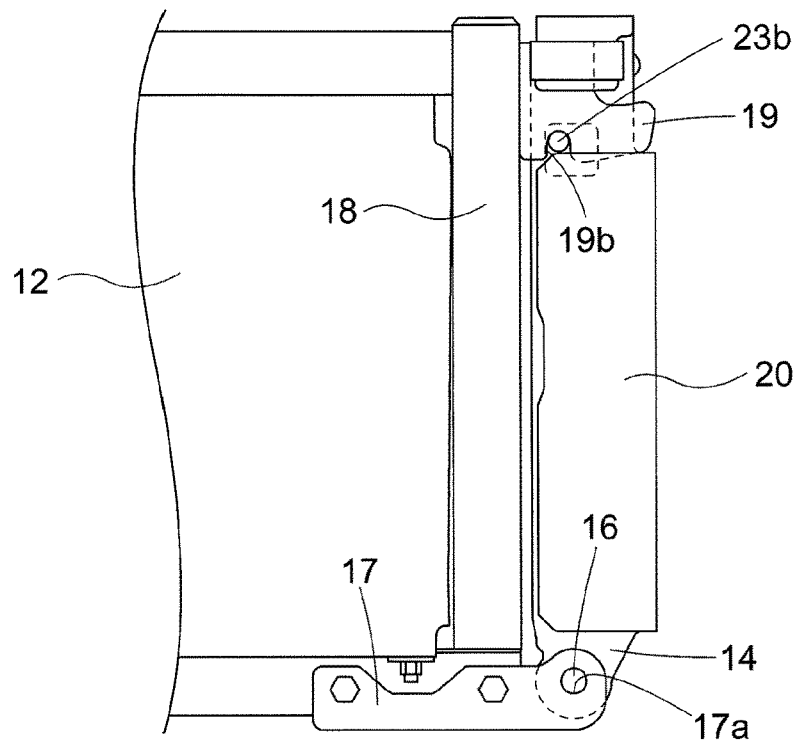
FIG. 4 is a side view showing an opening/closing arrangement of the rear gate.
Figure 5:
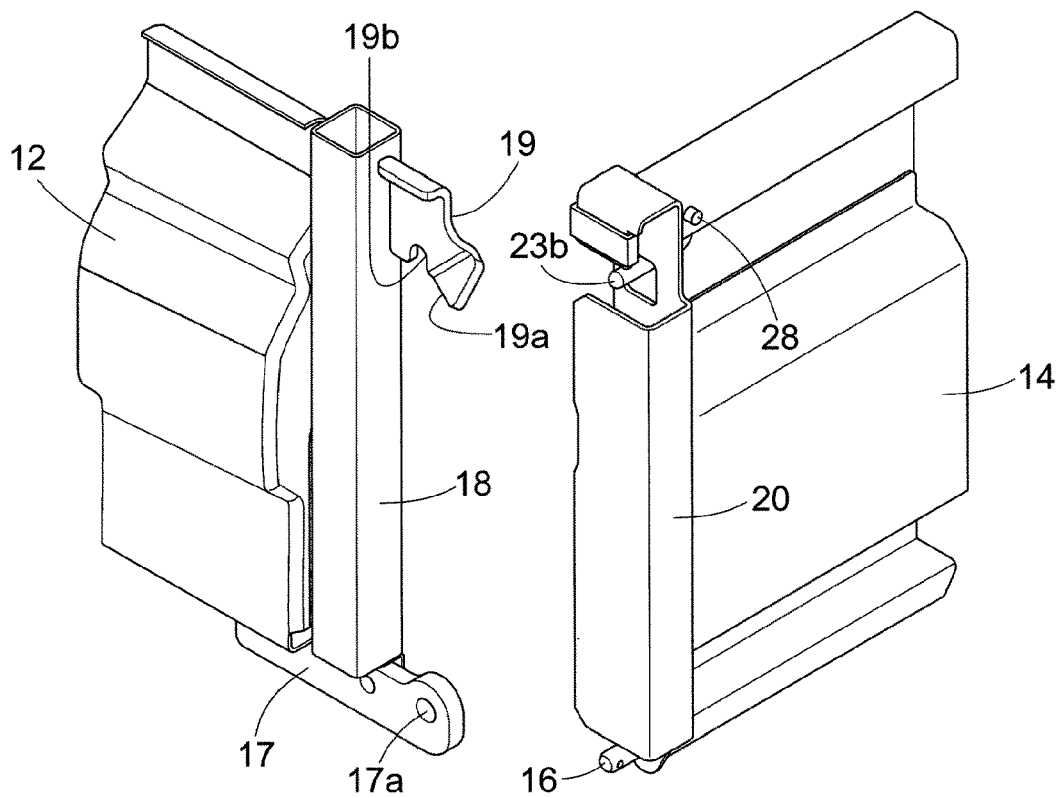
FIG. 5 is an exploded perspective view showing the opening/closing arrangement of the rear gate.

As shown in FIGS. 3 through 5, the opening/closing support shaft 16, at the lower end of the rear gate 14, protrudes from the end portions in the left/right direction to the outer sides. At the rear end portions of the lower ends of the left and right side panels 12, there are fixed support brackets 17 protruding rearwards. The opening/closing support shaft 16 is inserted into support holes 17a formed at the rear ends of the support brackets 17 to extend therethrough in the left/right direction. With this, the rear gate 14 is supported to be openable and closable about the opening/closing support shaft 16 relative to the side panels 12.

In particular, there is provided a restricting member (not shown) for maintaining the rear gate 14 under a rearwardly protruding posture under the horizontal posture as indicated by the two-dot chain lines in FIG. 1 when the rear gate 14 has been switched over to the opening posture.

As shown in FIG. 5, at the rear ends of the left and right side panels 12, end frames 18 made of angular pipes are fixed under a vertical posture and engagement plates 19 protrude rearwards from the upper end portions of the end frames 18. This engagement plate 19 is constituted of a vertically oriented plate member including a guide portion 19a formed at the lower end edge thereof and a receded locking engagement portion 19b receded upwards from this guide portion 19a.

As shown in FIGS. 3 through 5, at the opposed end portions of the rear gate 14 in the left/right direction, end portion frames 20 having a U-shaped cross section are fixed under a vertical posture. This end portion frame 20 includes, as seen in a plan view, left and right side walls and a rear wall at its rear portion, and the inner side wall of the respective left and right side wall defines an opening, through which a leading end portion of a rod-like locking member 23b of a locking operational portion 23 is to be exposed.

[Locking Mechanism]

Figure 6:
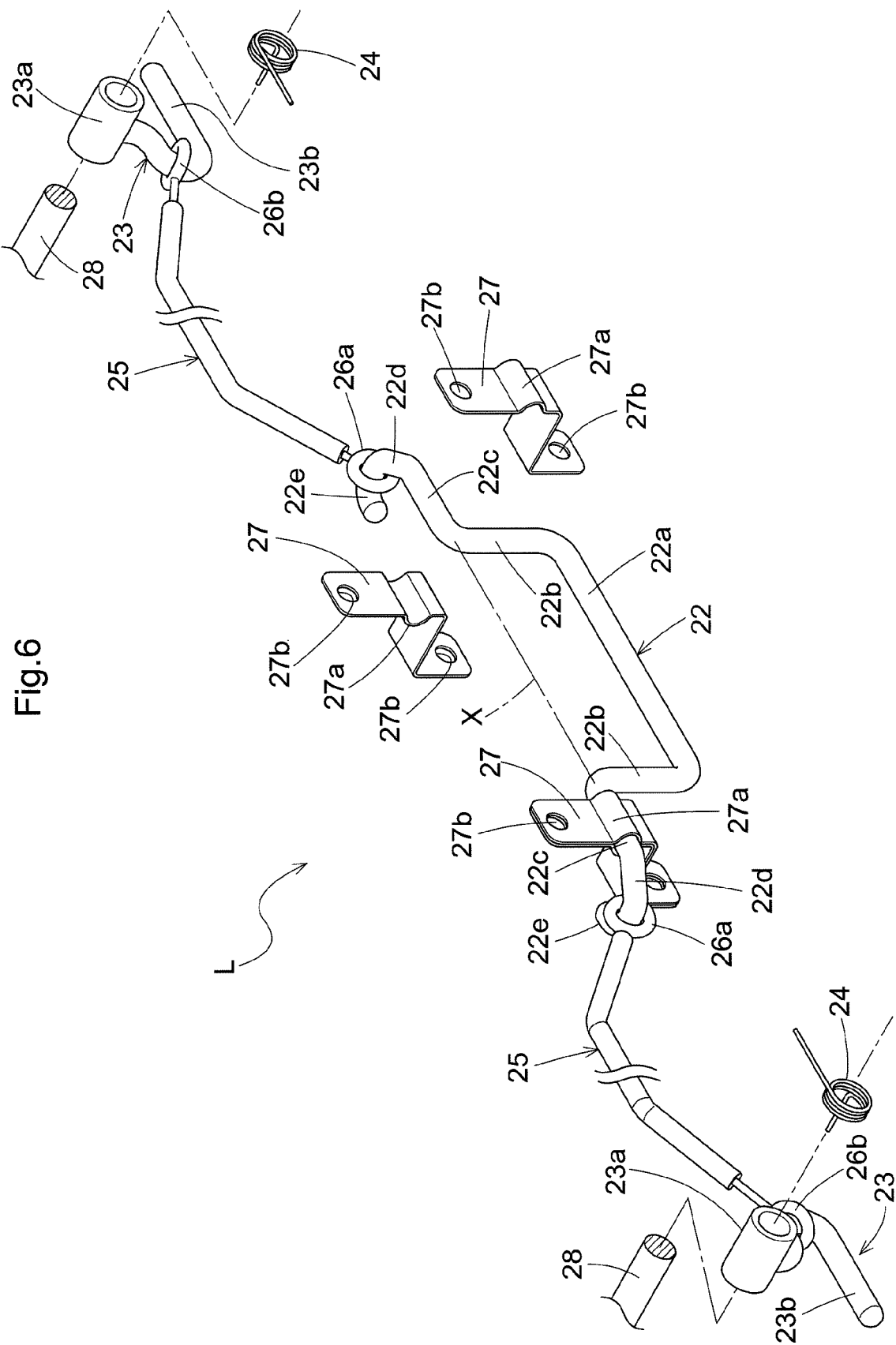
FIG. 6 is a perspective view showing an arrangement of a locking mechanism.

As shown in FIG. 3 and FIG. 6, the locking mechanism L includes a single handle 22, the left and right locking operational portions 23, a pair of left and right lock springs 24 (an example of an "urging member") and a pair of left and right operational wires 25. In particular, with this locking mechanism L, lock releasing operations of the left and right locking operational portions 23 are effected at one time by an operation of the single handle 22.

The handle 22 is provided at a position exposed to the rear side at the center in the left/right direction of the rear gate 14. The left and right locking operational portions 23 are provided at positions which are located at the respective left and right end portions of the rear gate 14 and at which the locking members 23b are exposed through the openings of the end portion frames 20 of the rear gate 14. The lock springs 24 provide urging forces to cause the left and right locking members 23b to protrude individually. The operational wires 25 are disposed at areas extending from the left and right positions of the handle 22 to the left and right locking operational portions 23 in order to transmit a force generated in association with an operation of the handle 22 when this handle 22 is operated, to the left and right locking members 23b.

As shown in FIG. 6, with this handle 22, by bending a single round bar member made of iron steel material, stainless material or the like, a handle body portion 22a, a pair of arm portions 22b, a pair of supporting portions 22c, left and right operational portions 22d and retaining portions 22e are formed integrally of each other.

In this handle 22, the handle body portion 22a is disposed under a posture along the left/right direction of the rear gate 14. The arm portions 22b are bent to be continuous with the opposed ends of the handle body portion 22a in the direction orthogonal thereto and the supporting portions 22c are formed with further bending from the outer end portions of the left and right arm portions 22b. The pair of supporting portions 22c and the handle body portion 22a are formed with a posture parallel to each other.

Further, at the outer end positions of the left and right supporting portions 22c, the operational portions 22d are formed under a posture bent relative to the respective supporting portions 22c. And, the retaining portions 22e are formed by further bending the outer end positions of the left and right operational portions 22d. This retaining portion 22e functions for retention of an inner end ring 26a to be described later herein.

The pair of supporting portions 22c are rotatably supported to the rear gate 14 by support plates 27. The centers of the supporting portions 22c rotatably supported by the support plates 27 as described above constitute an operational axis X. As shown in FIG. 6, the support plate 27 is constituted of two plate members superposed to each other and in order to rotatably hold the supporting portion 22c, each one of the plate members defines a shaft receiving portion 27a having a semi-circular recessed shape. At opposed end of the support plate 27, there are formed screw holes 27b in which fixing screws (not shown) are to be inserted. Incidentally, the shaft receiving portions 27a formed in the two plate members will together form a circular cross sectional shape when the two plate members are superposed to each other. As the supporting portion 22c is held by/between these shaft receiving portions 27a, the supporting portion 22c is rotatably supported.

Figure 7:
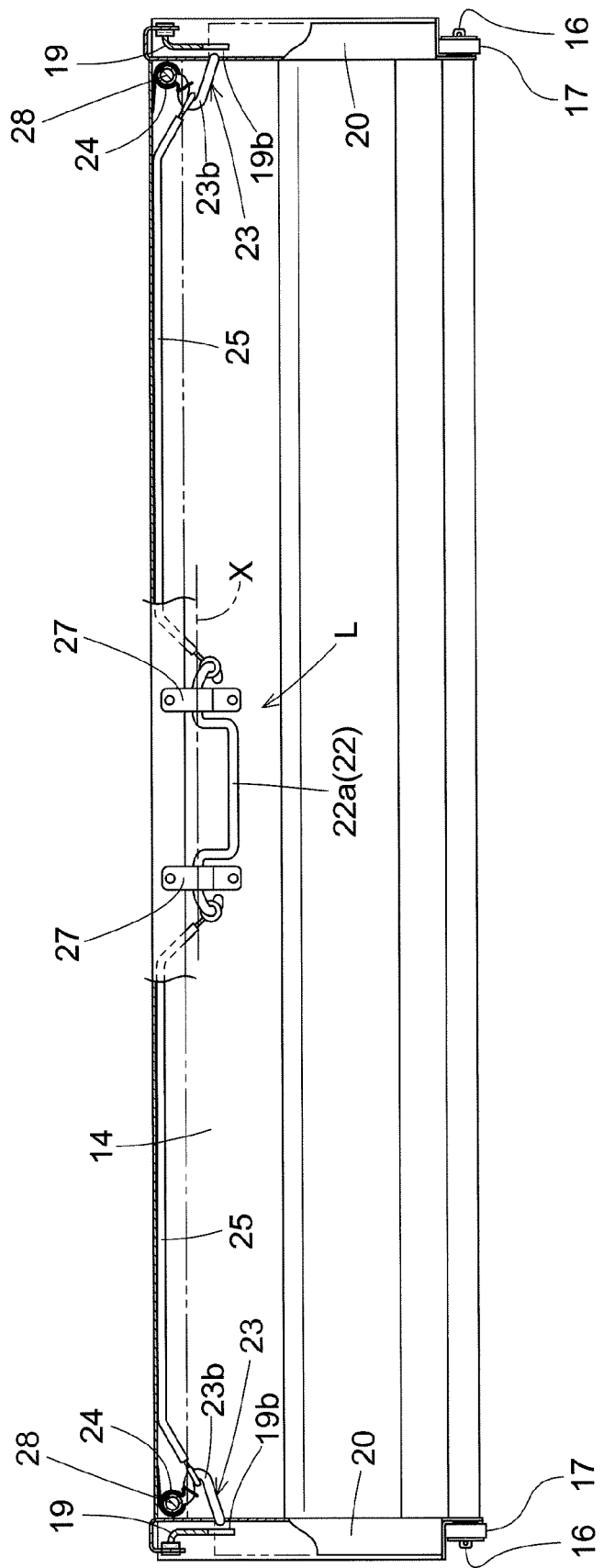
FIG. 7 is a rear view showing the rear gate with its locking state being released.

The locking operational portion 23 is constituted of a tubular portion 23a in the form of a cylinder and a locking member 23b protruding from the side face of this tubular portion 23a to the outer side. The tubular portion 23a is rotatably supported to a shaft member 28 fixed to the rear gate 14. With this, the locking member 23b, as being rotated together with the tubular portion 23a, can be switched over between a locking posture in which its protruding end protrudes to the outer side in the left/right direction as shown in FIGS. 3 and 8 and a releasing posture in which its protruding end recedes to the inner side as shown in FIGS. 7 and 9.

As shown in FIG. 3, FIG. 6, FIG. 8 and FIG. 9, the lock spring 24 is configured as a torsion spring which has its coiled portion fitted on the tubular portion 23a and has its one side arm portion engaged with the locking member 23b and its other side arm portion engaged with the rear gate 14.

Figure 8:
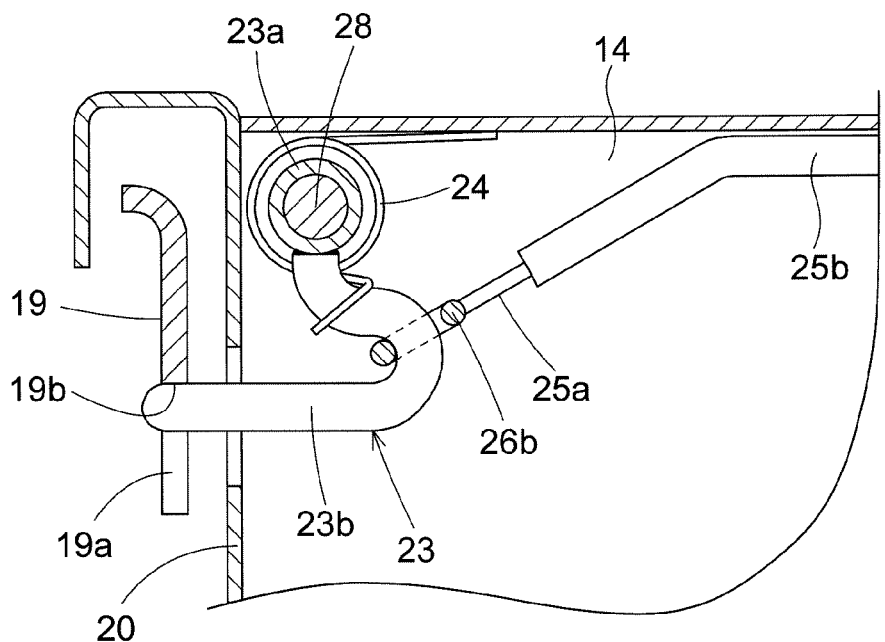
FIG. 8 is a section view showing a locking member under a locking posture.
Figure 9:
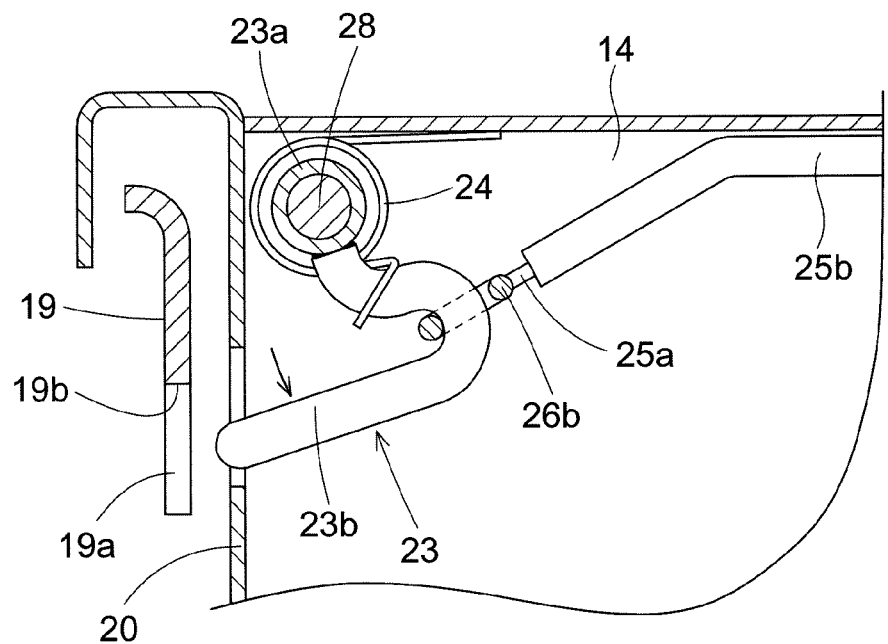
FIG. 9 is a section view showing the locking member operated to a releasing posture.

As shown in FIG. 6, FIG. 8 and FIG. 9, each one of the pair of operational wires 25 is constituted of an inner wire 25a formed of a metal cable and a tubular outer wire 25b slidably accommodating the inner wire 25a. In this operational wire 25, the inner end ring 26a is connected to the inner end side of the inner wire 25a and an outer end ring 26b is connected to the outer end side of the inner wire 25a. The inner end ring 26a and the outer end ring 26b are provided respectively by forming steel material or highly rigid rein into a ring shape.

Further, on the pair of operational portions 22d of the handle 22 supported to the rear gate 14, the inner end rings 26a of the corresponding operational wires 25 are fitted and the outer end rings 26b of the corresponding operational wires 25 are fitted on the locking members 23b of the locking operational portions 23 supported to the left and right side of the rear gate 14, whereby the handle 22 is operably coupled with the left and right locking operational portions 23. As shown in FIG. 3 and FIG. 7, each operational wire 25 is disposed under a posture to extend in the left/right direction in the vicinity of the upper end of the rear gate 14.

[Operational Modes of Locking Mechanism]

As shown in FIG. 3 and FIG. 8, when the handle 22 is not operated, the locking mechanism L is maintained under a horizontal posture with the handle body portion 22a being disposed downwardly of the supporting portions 22c (operational axis X) and the operational portions 22d extending toward the vehicle body front side.

Further, in the locking mechanism L, when the handle 22 is not operated, the outer end portion of the locking member 23b, as shown in FIG. 8, protrudes to the outer side from the left/right outer end of the rear gate 14, to be engageable with the locking engagement portion 19b of the engagement plate 19.

With the above-described arrangement, under a condition of the handle 22 is not operated, if the rear gate 14 is manually operated to be switched from the opening posture indicated by the two-dot chain lines in FIG. 1 to the closing posture indicated by the solid lines in the same illustration, the movement will take place with the locking members 23b coming into contact with the guide portions 19a (see FIG. 5) of the engagement plates 19. When the locking member 23b reaches the position of the locking engagement portion 19b in association with the above movement, engagement with the locking engagement portion 19b will be realized due to the urging force of the lock spring 24, whereby the condition will be switched to the locking state, so that the rear gate 14 will be maintained under the closing posture.

Further, in the situation when the rear gate 14 is being maintained under the closing posture indicated by the solid lines in FIG. 1 by the locking mechanisms L, if the handle 22 is manually pulled to the rear side, as shown in FIG. 7 and FIG. 9, the handle body portion 22a will be pivoted about the operational axis X to be moved to more rear side than the supporting portions 22c (operational axis X), and in association with this movement, the operational portions 22d will be displaced downwards. With this displacement, the inner wires 25a of the operational wires 25 are pulled, and with this pulling force, the locking members 23b are operated to the releasing posture shown in FIG. 9.

In this way, as the locking members 23b are operated to the releasing posture, the locking members 23b are removed from the locking engagement portions 19b of the engagement plates 19, whereby the rear gate 14 can be pivoted about the opening/closing support shaft 16 to be operated to the opening posture indicated by the two-dot chain lines in FIG. 1. Incidentally, this opening posture will be maintained by the restricting member described hereinbefore.

Function/Effect of Embodiment

As describe above, with this locking mechanism L, the handle 22 can be manufactured by bending a round bar member, thus, in comparison with manufacturing it by molding resin material in a mold or pressing a metal plate, reduction of the material cost and manufacture cost are made possible.

Further, with this locking mechanism L, although a work is needed for attaching the locking operational portions 23 to the rear gate 14 with predetermined precision, no high precision is required in the position for supporting the handle 22 or in the dimension of the operational wires 25, so the assembly of this locking mechanism L is not troublesome, and the manufacture thereof is easy.

Moreover, when the locking mechanism L is to be assembled, this can be completed by inserting the operative portions 22d of the handle 22 into the inner end rings 26a and inserting the locking members 23b into the outer end rings 26b. Thus, the assembly can be carried out easily. Further, with this arrangement, the maintenance of the locking mechanism L is made easy also.

Other Embodiment and Variations

The present invention may be alternatively embodied as follows (in the following discussion, those having same or substantially same functions as the foregoing embodiment will be denoted with same reference numerals or signs).

Figure 10:
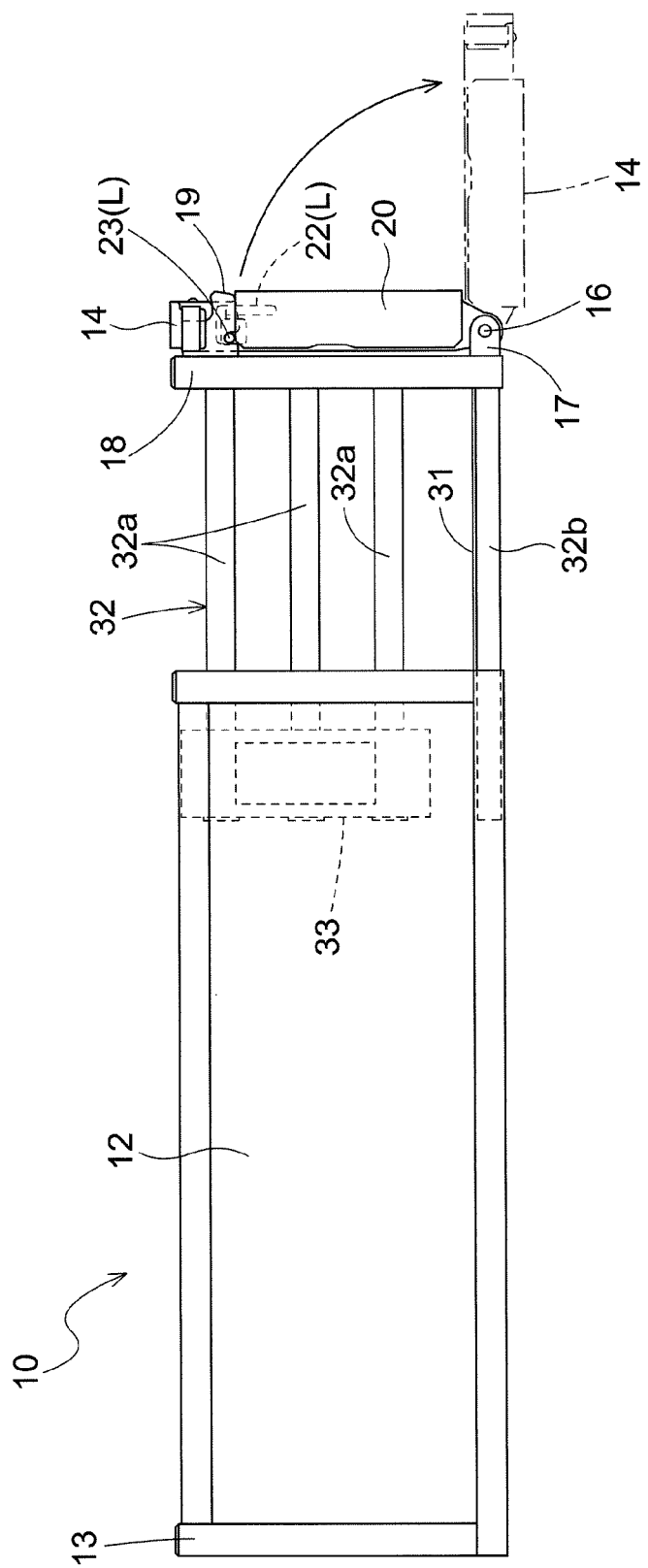
FIG. 10 is a side view of a load carrying bed in a further embodiment (a)
Figure 11:
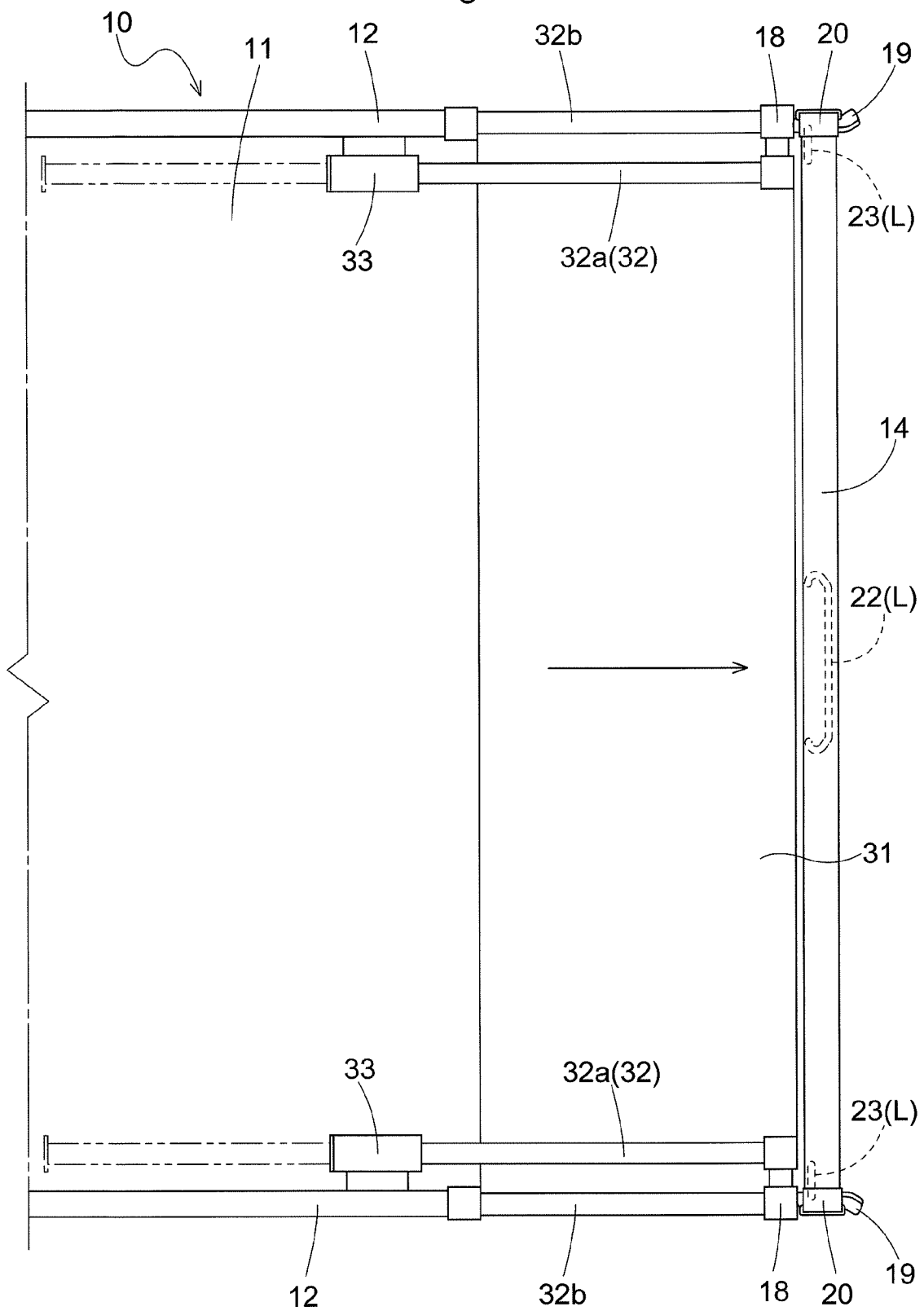
FIG. 11 is a plan view of the load carrying bed in the further embodiment (a).

(a) As shown in FIG. 10 and FIG. 11, like the foregoing embodiment, the load carrying bed 10 includes a floor panel 11 forming the bottom wall, a pair of left and right side panels 12 and a front panel 13 disposed on a front portion. In addition to this arrangement, in this further embodiment (a), side slide bodies 32 are disposed on the inner side (the center side of the load carrying bed 10) of the left and right side panels 12 and a slide floor 31 is provided at the position overlapped with the floor panel 11 and also at the rear end portions of the side slide bodies 32 and the slide floor 31, the rear gate 14 is provided.

In this further embodiment (a), the left and right side slide bodies 32 include a plurality of bar-like side rods 32a supported to be slidable in the front/rear direction relative to the guide member 33 fixedly provided to the inner side of the side panel 12 and a side frame 32b supported to the lower portion of the side panel 12 to be slidable in the front/rear direction.

The slide floor 31 is supported to the floor panel 11 to be slidable in the front/rear direction, with a portion of the slide floor 31 being overlapped with the floor panel 11 and left and right end portions of this slide floor 31 are connected to the end frame 18.

Rear ends of the plurality of side rods 32a and the rear end of the side frame 32b are connected to the end frame 18 and to the support bracket 17 provided in this end frame 18, the rear gate 14 is supported to be pivotable about the opening/closing support shaft 16. In particularly, the rear gate 14 includes a locking mechanism L having the configuration described in the foregoing embodiment and the handle 22 is provided at the center position in the left/right direction of the rear gate 14.

In the further embodiment (a), when the rear gate 14 is pulled out to the rear side manually, the left and right side slide bodies 32 and the slide floor 31 are displaced to be extended to the rear side, thus realizing increase of the load carrying-possible area of the load carrying bed 10. In particular, in this configuration, as the rear gate 14 is constituted of a plate-like member, in comparison with an arrangement of the plurality of side rods 32a having gaps, it is possible to resolve such inconvenience as rearward protrusion or leaking and fall of load through the gaps.

Further, in the further embodiment (a), like the foregoing embodiment, the rear gate 14 can be switched over between the closing posture indicated by the solid lines in FIG. 10 and the opening posture indicated by the two-dot chain lines in the same. And, there is provided a restricting member (not shown) for maintaining the rear gate 14 under a rearwardly protruding posture under the horizontal posture when the rear gate 14 has been switched over to the opening posture. Thus, by releasing the locking state of the locking mechanism L, it is possible to set the rear gate 14 to the opening posture protruding to the rear side, so that the load carrying-possible area of the load carrying bed 10 can be increased easily.

As a variation of this further embodiment (a), though not shown, an end frame 18 may be fixed to the rear end of the side panel 12 and an end portion frame 20 may be provided for a member to be withdrawn together with the side slide body 32 and the slide floor 31. In this variation, by releasing the locking state of the locking mechanism L by an operation of the handle 22, it becomes possible to pull out the side slide bodies 32 and the slide floor 31 and also to pivot the rear gate 14 to the rear side (switchover to the opening posture).

Further, in this variation, although it is not possible to maintain the rear gate 14 under the closing posture with the side slide bodies 32 and the slide floor 31 being pulled out, increase of the load carrying-possible area of the load carrying bed 10 is made possible with a simple operation.

(b) Each one of the left and right locking operational portions 23 includes a locking member slidable in the left/right direction (corresponding to the locking member 23b of the foregoing embodiment) and an urging member for operating this locking member in its protruding direction. With this arrangement too, the rear gate 14 can be maintained under the closing posture.

(c) In an alternative arrangement of the locking mechanism L, in place of the locking engagement portion 19b to which the locking member 23b of the left/right locking operational portion 23 comes into engagement, a hole portion may be formed e.g. on the inner face side (the side toward the center of the load carrying bed 10) of the end frame 18, so that the locking member 23b may be engageable in this hole portion.

(d) As the restricting member for maintaining the rear gate 14 under a rearwardly protruding posture under the horizontal posture when the rear gate 14 has been switched over to the opening posture, it is conceivable to employ a simple stopper or a wire or a string-like member for determining an opening limit of the rear gate 14.

INDUSTRIAL APPLICABILITY

The present invention is applicable to a work vehicle having a load carrying bed mounted on a vehicle body.

DESCRIPTION OF SIGNS

- 10: load carrying bed
- 11: floor panel
- 12: side panel
- 14: rear gate
- 19b: locking engagement portion
- 22: handle
- 22a: handle body portion
- 22c: supporting portion
- 22d: operational portion
- 23b: locking member
- 24: lock spring (urging member)
- 25: operational wire
- 25a: inner wire
- 26a: inner end ring
- 26b: outer end ring
- 28: shaft member
- L: locking mechanism
- X: operational axis

The invention claimed is:

1. A work vehicle, wherein:
a load carrying bed includes a floor panel, a pair of left and right side panels, a rear gate supported to be openable and closable, and a locking mechanism for maintaining the rear gate under its closing posture; and
the locking mechanism includes left and right locking members configured to maintain the rear gate under the closing posture by engaging locking engagement portions formed in the left and right side panels, a single handle disposed at an intermediate position in the left/right direction of the rear gate and supported to be pivotable about a horizontally oriented operational axis, and left and right operational wires for operating the left and right locking members in a direction for pulling these locking members out of the locking engagement portions by an operation of the handle about the operational axis, and
the locking mechanism includes an arrangement of supporting the locking members to be pivotable respectively about a shaft member and an urging member for causing the locking members to protrude to the outer side from left and right end portions of the rear gate by an urging force.

2. The work vehicle of claim 1, wherein:
the handle includes a manually operable handle body, a pair of left and right supporting portions formed coaxial with the operational axis relative to positions continuous from opposed ends of the handle body, and a pair of left and right operational portions formed at positions continuous from the pair of supporting portions;
the left side locking member and the operational portion on the left side of the handle are operably coupled to each other via an inner wire of the left side operational wire; and
the right side locking member and the operational portion on the right side of the handle are operably coupled to each other via an inner wire of the right side operational wire.

3. The work vehicle of claim 2, wherein the handle is formed by bending a single round bar member to form the handle body portion, the pair of supporting portions and the pair of operational portions integral with each other.

4. The work vehicle of claim 2, wherein the handle and the left and right locking members are operably coupled to each other by connecting inner end rings to inner ends of the left and right inner wires and connecting outer end rings to outer ends thereof and also by inserting into the inner end rings the left and right operational portions of the handle corresponding thereto and inserting into the outer end rings the left and right locking members corresponding thereto.

5. A work vehicle, wherein:
a load carrying bed includes a floor panel, a pair of left and right side panels, a rear gate supported to be openable and closable, and a locking mechanism for maintaining the rear gate under its closing posture;
the locking mechanism includes left and right locking members configured to maintain the rear gate under the closing posture by engaging locking engagement portions formed in the left and right side panels, a single handle disposed at an intermediate position in the left/right direction of the rear gate and supported to be pivotable about a horizontally oriented operational axis, and left and right operational wires for operating the left and right locking members in a direction for pulling these locking members out of the locking engagement portions by an operation of the handle about the operational axis;
the handle includes a manually operable handle body, a pair of left and right supporting portions formed coaxial with the operational axis relative to positions continuous from opposed ends of the handle body, and a pair of left and right operational portions formed at positions continuous from the pair of supporting portions;
the left side locking member and the operational portion on the left side of the handle are operably coupled to each other via an inner wire of the left side operational wire; and
the right side locking member and the operational portion on the right side of the handle are operably coupled to each other via an inner wire of the right side operational wire.

* * * * *